United States Patent
Sera (10) Patent No.: US 7,911,546 B2
(45) Date of Patent: Mar. 22, 2011

(54) LIQUID CRYSTAL DEVICE AND ELECTRONIC APPARATUS

(75) Inventor: Hiroshi Sera, Chino (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 11/960,256

(22) Filed: Dec. 19, 2007

(65) Prior Publication Data

US 2008/0211975 A1  Sep. 4, 2008

(30) Foreign Application Priority Data

Mar. 2, 2007 (JP) .................. 2007-052348

(51) Int. Cl.
  *G02F 1/1335* (2006.01)
  *G02F 1/1339* (2006.01)
(52) U.S. Cl. ......................................... 349/12; 349/156
(58) Field of Classification Search .................... 349/12, 349/113, 114, 155, 156
See application file for complete search history.

(56) References Cited

U.S. PATENT DOCUMENTS

| 6,501,526 B1 * | 12/2002 | Oh ................................ 349/155 |
| 2004/0155991 A1 * | 8/2004 | Lowles et al. .................... 349/12 |
| 2005/0179853 A1 | 8/2005 | Chen et al. |
| 2007/0103635 A1 * | 5/2007 | Tawaraya et al. ............. 349/156 |

FOREIGN PATENT DOCUMENTS

| JP | A 6-175133 | 6/1994 |
| JP | A 10-82909 | 3/1998 |
| JP | A 2002-333630 | 11/2002 |
| JP | A-2002-341354 | 11/2002 |
| JP | A-2003-270640 | 9/2003 |
| JP | A-2005-234570 | 9/2005 |
| JP | A-2007-94064 | 4/2007 |
| JP | A-2007-232839 | 9/2007 |
| JP | A-2007-286384 | 11/2007 |
| JP | A-2007-316363 | 12/2007 |
| JP | A-2008-158138 | 7/2008 |

* cited by examiner

*Primary Examiner* — David Nelms
*Assistant Examiner* — David Y Chung
(74) *Attorney, Agent, or Firm* — Oliff & Berridge, PLC (57) ABSTRACT

A liquid crystal device includes a substrate, an opposing substrate disposed so as to face the substrate, a liquid crystal layer interposed between the substrate and the opposing substrate, and a plurality of spacers disposed between the substrate and the opposing substrate and having different aspect ratios from each other.

3 Claims, 6 Drawing Sheets

FIG. 8

LIQUID CRYSTAL DEVICE AND ELECTRONIC APPARATUS

BACKGROUND

1. Technical Field

The present invention relates to a liquid crystal device having a touch key function and an electronic apparatus including the liquid crystal device.

2. Related Art

In such a liquid crystal device, beads are distributed between a TFT array substrate and an opposing substrate with a liquid crystal layer interposed in between in order to maintain a constant distance (so called, an inter-substrate gap) between the substrates. There is the probability that such beads bring problems such as contrast degradation of the liquid crystal device and degradation of display performance of the liquid crystal device. In particular, in a lateral electric field type liquid crystal device controlling alignment of liquid crystals by a lateral electric field applied along the surface of the TFT array substrate, the contrast degradation is significant. There are known liquid crystal devices maintaining the constant inter-substrate gap by using spacers each having a pillar form, disposed between the TFT array substrate and the opposing substrate, in order to suppress such contrast deterioration. The spacers having a pillar form can be formed by performing light-exposure processing with respect to a positive type photosensitive material, such as acryl or polyimide (for example, JP-A-10-82909 and JP-A-6-175133). Further, JP-A-2002-333630 discloses a liquid crystal device using spacers which are buried in a sealing member allowing a pair of substrate to be bonded to each other and which have high rigidity coefficient.

On the other hand, as for such a kind of liquid crystal devices, there is known a liquid crystal device having a touch key function which checks whether input means such as a finger presses a displaying surface of the liquid crystal device by detecting the change of capacitance between the TFT array substrate and the opposing substrate, which is generated when the input means such as a finger presses the displaying surface, and which can enable the input of various information.

However, in such a kind of liquid crystal device, it is technically difficult to form spacers having a uniform size using a photolithography technique so there is a technical problem in that the size variation of the spacers occurs. In addition, there is the probability that the liquid crystal device contracts when environment, such as ambient temperature at which the liquid crystal device is used, changes and thus it is difficult to maintain the uniform inter-substrate gap in such a case.

Further, there is a problem in that size of resin patterns to be turned into spacers before exposure must be larger than size of the spacers so the spacers can be stably formed when simultaneously forming a plurality of spacers using a photolithography process. There is still a further problem in that an aperture ratio is lowered according to the sizes of the spacers as the aspect ration of the spacers becomes lower. Here, if the aperture ratio is raised by reducing the size of spacers, the strength of the spacers becomes insufficient, and thus the inter-substrate gap cannot be maintained by the spacers. If density of the spacers on the substrate is increased on purpose to supplement insufficiency of the strength of the spacers, the number of exposure processes is increased, and thus the manufacturing process of the liquid crystal device becomes complex.

In the liquid crystal device having a touch key function, input of a variety of kinds of information can be accomplished by detecting the change of capacitance between the TFT array substrate and the opposing substrate, which is generated when the opposing substrate is pressed. However, there can be a problem with the liquid crystal device having the touch key function in that if the opposing substrate is in contact with the TFT array substrate, the substrates are short-circuited, and thus the capacitance cannot be detected.

SUMMARY

An advantage of some aspects of the invention is that it provides a liquid crystal device of which a manufacturing process is not complex and which has high reliability thanks to secure maintenance of an inter-substrate gap, and provides an electronic apparatus including such a liquid crystal device. In addition, it provides a liquid crystal device having a touch key function and being capable of reducing troubles occurring when an opposing substrate is pressed. It further provides an electronic apparatus having such a liquid crystal device having the touch key function.

A liquid crystal device includes a substrate, an opposing substrate disposed so as to face the substrate, a liquid crystal layer interposed between the substrate and the opposing substrate, and a plurality of spacers which are disposed between the substrate and the opposing substrate and which have different aspect ratios from each other.

In the liquid crystal device, it is preferable that the substrate is a TFT array substrate on which pixel switching elements such as thin film transistors (TFTs) are formed. When driving the liquid crystal device, an intended image is displayed at a display region by controlling alignment of liquid crystals in a liquid crystal layer interposed between pixel electrodes formed on the TFT array substrate and an opposing electrode formed on the opposing substrate.

The plurality of spacers is disposed between the substrate and the opposing substrate and has different aspect ratios from each other. The plurality of spacers is made of a positive type photosensitive material such as acryl resin or polyimide resin, and can be formed in a predetermined form by performing exposure processing with respect to the resin by a photolithography method. Since the plurality of spacers has different aspect ratios from each other, in the case in which the liquid crystal device contracts due to lowered temperature, it is possible to maintain the inter-substrate gap using spacers having a smaller aspect ratio (i.e. a lower height) than spacers having a first height instead of maintaining the inter-substrate gap by using the spacers having the first height of the plurality of spacers. Accordingly, even in the case in which the liquid crystal device contracts so as to adapt to ambient temperature, it is possible to prevent the reliability of the liquid crystal device from deteriorating by securely maintaining the inter-substrate gap by some of the plurality of spacers having different aspect ratios from each other. Further, it is preferable that the spacers having the same aspect ratio of the plurality of spacers having different aspect ratios are uniformed distributed over the entire area of the substrate on the point of uniformly maintaining the inter-substrate gap over the entire substrate.

In addition, according to the liquid crystal device of the invention, it is possible to form spacers having different aspect ratios from each other, i.e., having different heights from each other by one exposure process and thus it is possible to prevent the manufacturing process of the liquid crystal device from becoming complex by a method of preliminary adjusting sizes of resin patterns, i.e., widths of resin patterns to be spacers before exposure. In greater detail, since light runs around the resin pattern which are an object of the exposure when performing the exposure, it is possible to form a plurality of spacers having different aspect ratios from each other thanks to different widths of resin patterns by performing exposure with respect to a plurality of resin patterns having different widths from each other at a time. Accordingly, when forming a plurality of spacers having different aspect ratios from each other, there is no need to perform a plurality of times of exposures and thus it is possible to prevent the manufacturing process of the liquid crystal device from becoming complex.

Accordingly, according to the liquid crystal device of the invention, it is possible to provide a liquid crystal device having high reliability by maintaining the inter-substrate gap in the liquid crystal device while preventing the manufacturing process from becoming complex.

In the liquid crystal device, it is preferable that a display region on the substrate includes a transmissive region in which light emitted from a light source and made incident onto a surface of the liquid crystal layer from the substrate side is modulated so as for the light to become modulated light according to an alignment state of the liquid crystal layer and the modulated light reaches the opposing substrate, and a light reflective region in which light entering the liquid crystal layer from the opposing substrate side is reflected so as to be turned back to the opposing substrate, in which one spacer of the plurality of spacers and remaining spacers having an aspect ratio different from that of the one spacer are arranged in the transmissive regent and the reflective region, respectively.

With such a structure, since the one spacer of the plurality of spacers and the remaining spacers having an aspect ratio different from that of the one spacer are arranged in the transmissive region and the reflective region, respectively, it is possible to securely maintain the inter-substrate gap in both regions and thus it is possible to prevent display grade of the liquid crystal device from deteriorating.

In the liquid crystal device, it is preferable that the liquid crystal device has a touch key structure enabling a variety of information to be input by the change of capacitance generated between the opposing substrate and the substrate when a surface of the opposing substrate, which does not face the liquid crystal layer, is pressed and has a structure in which predetermined spacers of the plurality of spacers are formed so as not to be in contact with opposing substrate.

In such a structure, the touch key function is realized in a manner such that input of a plurality of information is accomplished by a capacitor system using input means such as a finger. Thanks to such a structure, even in the case in which the opposing substrate is bent toward the substrate, bending of the opposing substrate is limited by the predetermined spacers and thus it is possible to prevent the opposing substrate and the substrate from coming into contact with each other. With such a structure, even in the case in which the opposing substrate is pressed, it is possible to securely maintain the inter-substrate gap between the opposing substrate and the substrate thanks to the predetermined spacers, and thus it is possible to prevent the touch key function from malfunctioning.

A further aspect of the invention provides an electronic apparatus including the liquid crystal device according to the above-described aspect.

Since the electronic apparatus includes the above-mentioned liquid crystal device, it is possible to realize a variety of electronic apparatuses which has the touch key function and can perform high grade display, such as a projective display device, a cellular phone, an electronic organizer, a word processor, a view finder type or a monitor direct viewing type video recorder, a workstation, a video conferencing type telephone, a POS terminal, or the like. Further, as the electronic apparatus, it is possible to realize an electrophoretic device such as electronic paper.

Such effects and other advantages will be apparent from the following description.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
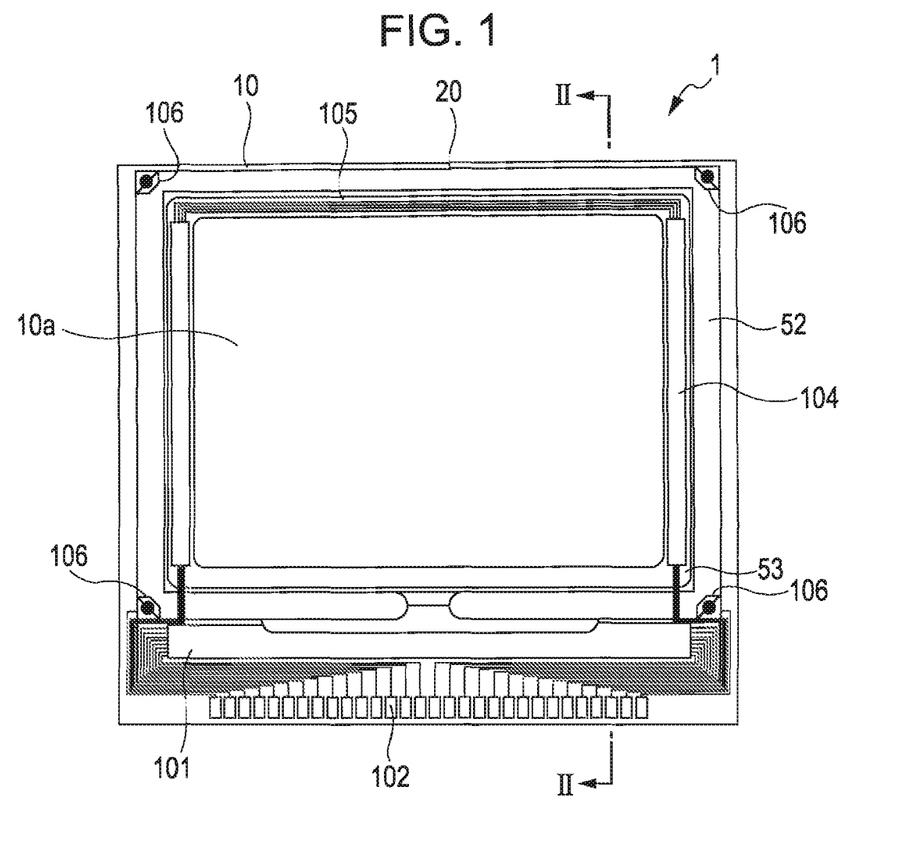
FIG. 1 is a plan view illustrating a liquid crystal device according to one embodiment of the invention, in which the liquid crystal device is viewed from the opposing substrate side.
Figure 2:
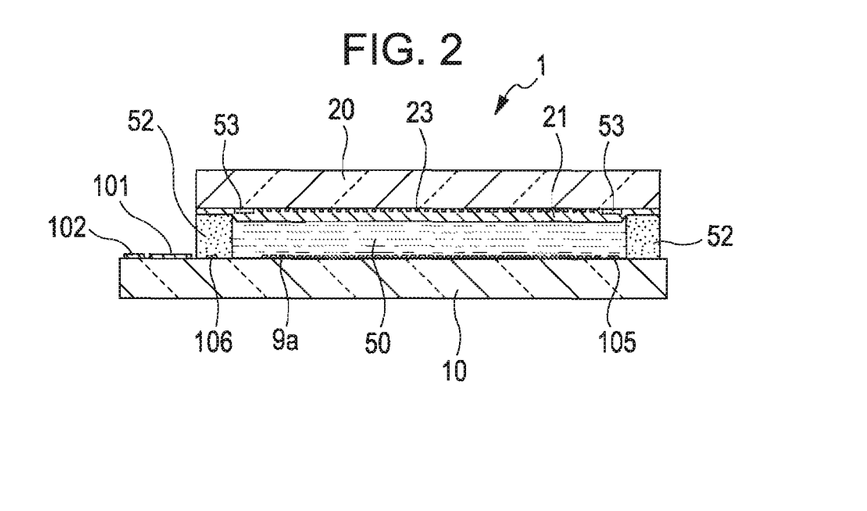
FIG. 2 is a sectional view taken along line II-II' shown in FIG. 1.

Hereinafter, a liquid crystal device and an electronic apparatus according to a variety of embodiments will be described with reference to the accompanying drawings, 1: Liquid Crystal Device 1-1: Overall Structure of Liquid Crystal Device Overall structure of a liquid crystal device according to one embodiment of the invention will be described with reference to FIGS. 1 and 2. FIG. 1 is a plan view illustrating the liquid crystal device 1, and more particularly illustrating a TFT array substrate and various elements formed on the TFT array substrate, which are viewed from the opposing substrate side. FIG. 2 is a sectional view taken along line II-II' shown in FIG. 1. The liquid crystal device 1 according to this embodiment is driven by a driving circuit embedded TFT active matrix driving method. In addition, the liquid crystal device 1 has a touch key function enabling a variety of information to be input by detecting the change of capacitance generated between an opposing electrode 21 and pixel electrodes 9a which will be described below.

In FIGS. 1 and 2, in the liquid crystal device 1, the TFT array substrate 10 and the opposing substrate 20 are arranged so as to face each other. A liquid crystal layer 50 is sealed between the TFT array substrate 10 and the opposing substrate 20. The TFT array substrate 10 and the opposing substrate 20 are bonded to each other by a sealing member 52 disposed at a perimeter region around an image display region 10*a* in which a plurality of pixels is disposed.

The sealing member 52 is made of ultraviolet ray (UV)-curable resin or heat-curable resin in order to bond the substrates to each other. In the manufacturing process, the sealing member 52 is formed by coating the UV-curable resin or the heat-curable resin on the TFT array substrate 10 and then curing the UV-curable resin or the heat-curable resin by ultraviolet ray irradiation or heating. The sealing member 52 contains gap members, such as glass fiber or glass beads, distributed therein in order to maintain a predetermined distance (inter-substrate gap) between the TFT array substrate 10 and the opposing substrate 20.

Inside a sealing region at which the sealing member 52 is disposed, a frame-shaped opaque film 53 having opaque characteristic and defining a boundary of the image display region 10*a* is disposed on the opposing substrate 20. However, the frame-shaped opaque film 53 may be formed, partially or entirely, on the TFT array substrate 10 as an embedded opaque film. Further, there is a perimeter region located around the image display region 10*a*. In other words, in this embodiment, a region farther from the center of the TFT array substrate 10 than the frame-shaped opaque film 53 may be defined as the perimeter region.

A data line driving circuit 101 and external circuit connection terminals 102 are disposed along one first edge of the TFT array substrate 10 outside the sealing region, at which the sealing member 52 is disposed, in the perimeter region. The scan line driving circuits 104 are disposed along two second edges adjacent to the first edge, respectively, and are disposed so as to be covered with the frame-shaped opaque film 53. Further, a plurality of wirings 105 is disposed along a remaining edge of the TFT array substrate 10 in order to connect the two scan line driving circuits 104 disposed on both sides of the image display region 10*a* and is disposed so as to be covered with the frame-shaped opaque film 53.

Vertical conductive members 106 functioning as vertical conductive terminals between both the substrate and the opposing substrate are arranged at four corners of the opposing substrate 20. On the other hand, vertical conductive terminals are also disposed on the TFT array substrate 10 at positions corresponding to the corners of the opposing substrate 20. With such a structure, the TFT array substrate 10 and the opposing substrate 20 can be electrically connected. The opposing electrode 21 has a fixed potential, and constitutes one exemplary touch key-structure of the invention along with the pixel electrodes 9*a*.

As shown in FIG. 2, an aligning film is formed on the TFT array substrate 10 having TFTs for pixel switching and wirings serving as scan lines and data lines so as to cover the pixel electrodes 9*a*. On the other hand, on the opposing substrate 20 is provided the opposing electrode 21 and an opaque film 23 having a matrix shape or a stripe shape. An aligning film is formed as the top film on the opposing substrate 20. The liquid crystal layer 50 is made of one kind of liquid crystals or a mixture of a plurality of different kinds of liquid crystals. The liquid crystal layer 50 is disposed between a pair of the aligning films and is in a predetermined alignment state.

Besides the driving circuits such as the data line driving circuit 101 and the scan line driving circuits 104, on the TFT array substrate 10 shown in FIGS. 1 and 2 is provided a sampling circuit which samples image signals on image signal lines and supplies the sampled image signals to the data lines, a pre-charge circuit which preliminarily supplies a pre-charge signal having a predetermined voltage level to the plurality of data lines before supply of the image signals, and a test circuit which is used to test quality and defects of the electro-optical device during manufacturing and shipping.

1-2: Structure of Pixel Portion

Figure 3:
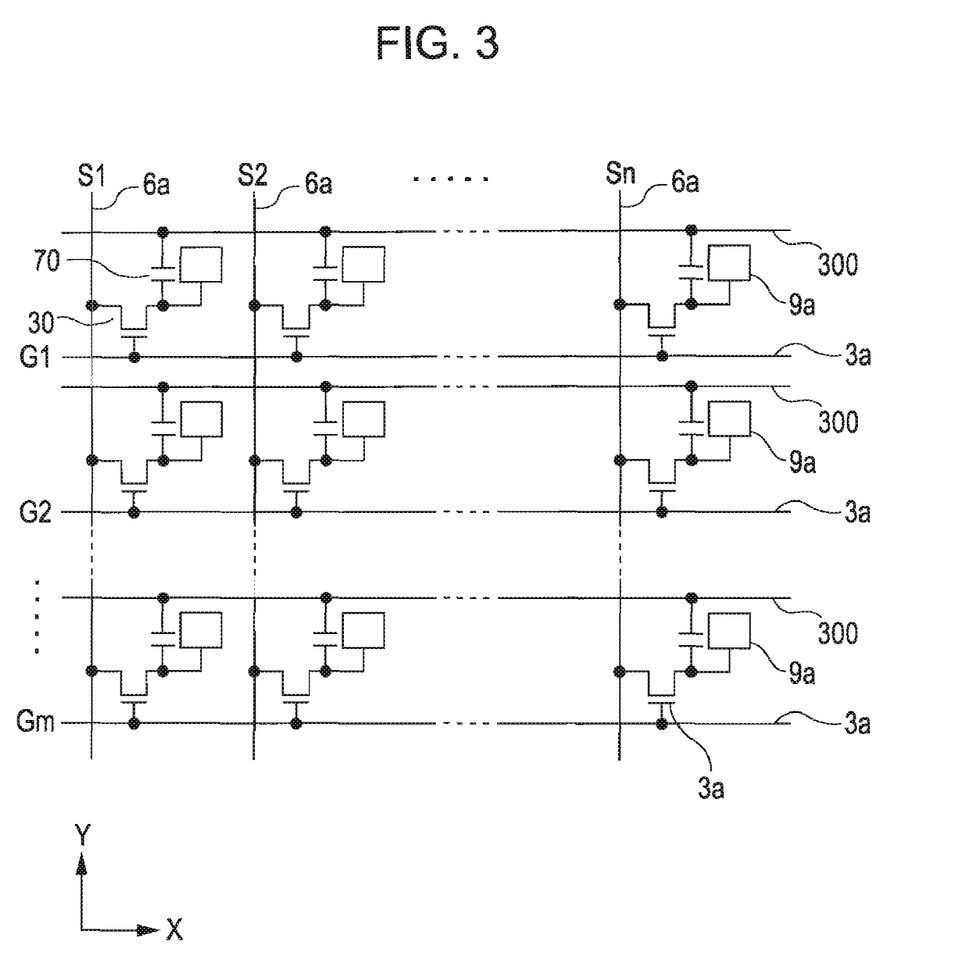
FIG. 3 is a circuit diagram illustrating equivalents of a plurality of pixels arranged in a matrix form, a variety of elements, and wirings in a display region of the liquid crystal device according to the embodiment.
Figure 4:
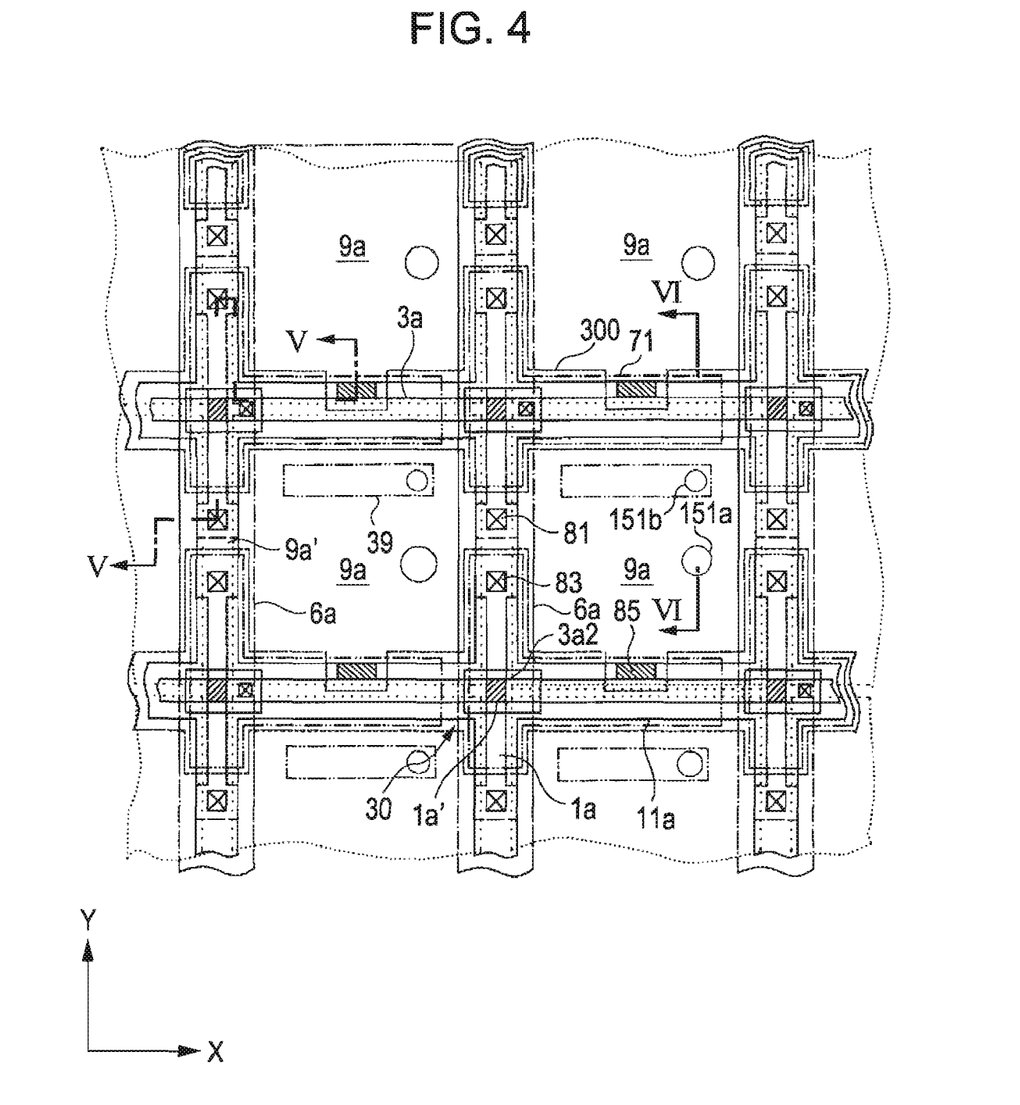
FIG. 4 is a plan view illustrating a plurality of pixel groups adjacent to each other on a TFT array substrate on which data lines, scan lines, and pixel electrodes are formed in the liquid crystal device according to the embodiment.
Figure 5:
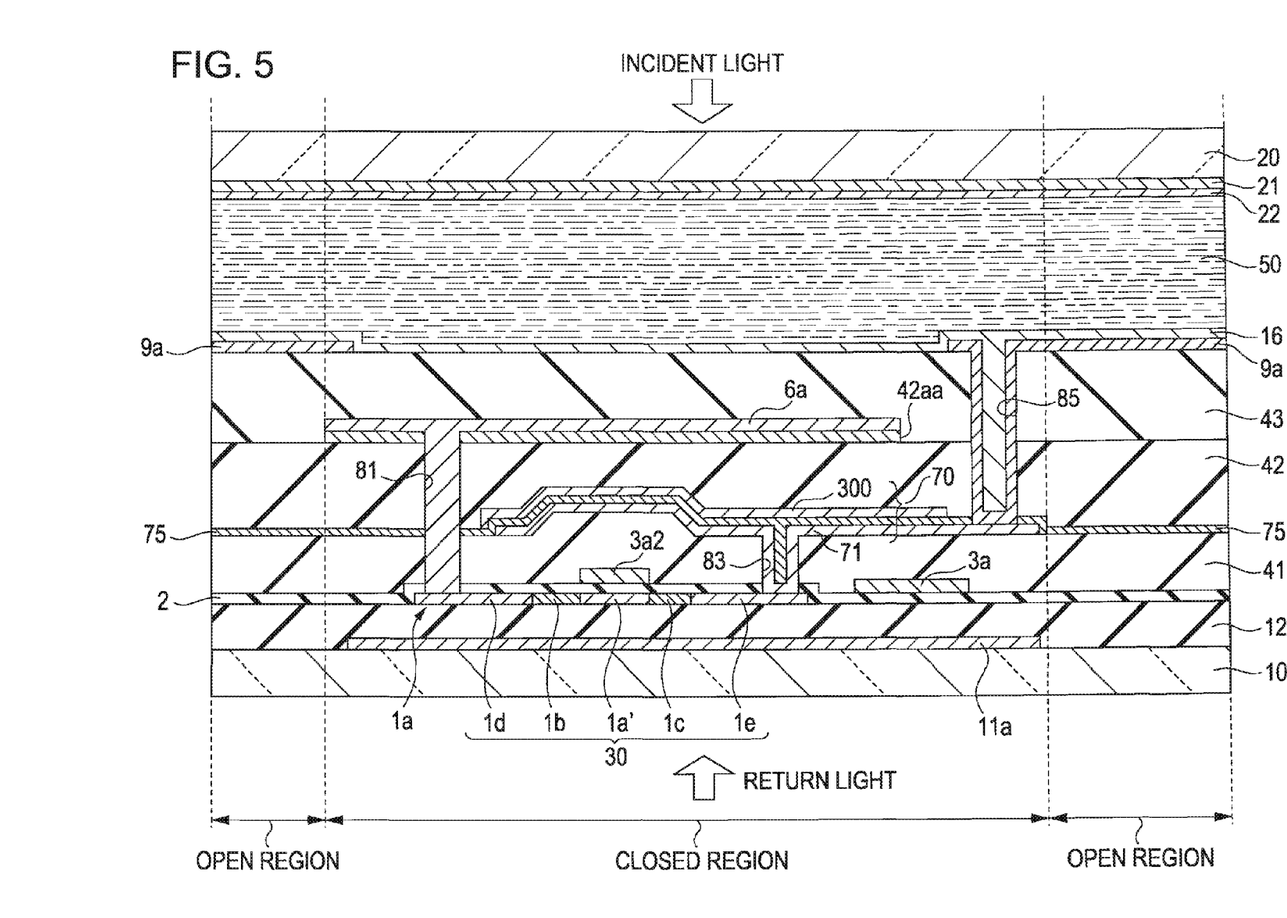
FIG. 5 is a sectional view taken along line V-V' shown in FIG. 4.
Figure 6:
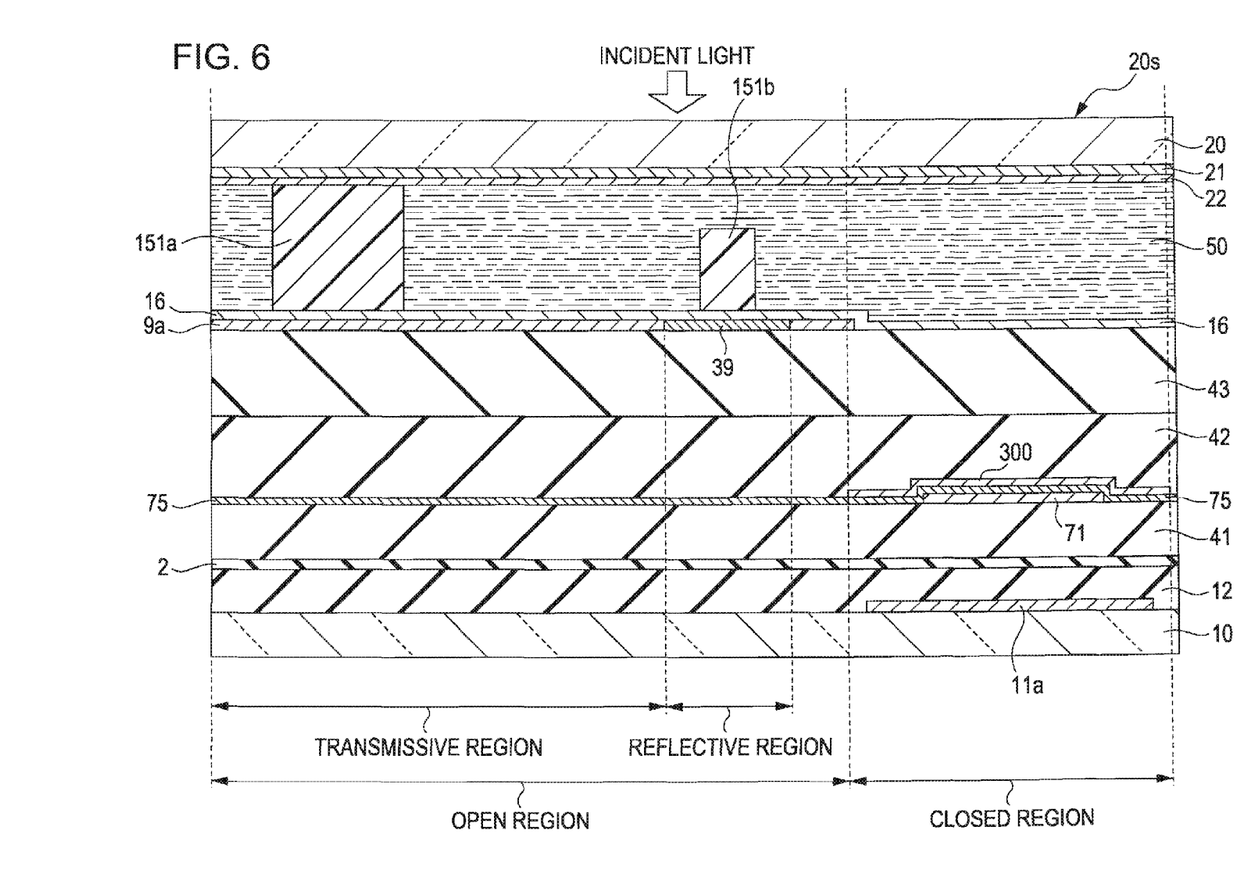
FIG. 6 is a sectional view taken along line VI-VI' shown in FIG. 4.

Next, with reference to FIGS. 3 to 6, a structure of a pixel portion of the liquid crystal device 1 will be described in detail. FIG. 3 shows equivalent circuits of various elements and wirings in a plurality of pixels formed in a matrix form, which constitutes an image display region 10*a* of the liquid crystal device 1. FIG. 4 is a plan view illustrating a plurality of pixel groups adjacent to each other relative to the TFT array substrate on which the data lines, the scan lines, and the pixel electrodes are formed. FIG. 5 is a sectional view taken along line V-V' shown in FIG. 4. FIG. 6 is a sectional view taken along line VI-VI' shown in FIG. 4. Further, layers and members shown in FIGS. 5 and 6 are not shown in real scale but shown in visible scale.

In FIG. 3, each pixel of the plurality of pixels arranged in a matrix form, which constitutes the image display region 10*a* of the liquid crystal device 1, is provided with a pixel electrode 9*a* and a TFT 30. Each TFT 30 is electrically connected to the pixel electrode 9*a*, and controls switching of the pixel electrode 9*a* when the liquid crystal device 1 is driven. In each pixel, the data line 6*a* to receive the image signal is electrically connected to a source of the TFT 30. The image signals S1, S2, ..., Sn may be sequentially supplied to the data lines 6*a* in this order, or may be simultaneously supplied to a group of the data lines 6*a* adjacent to each other, in the case in which the plurality of data lines 6*a* are grouped into a plurality of groups each group including a plurality of data lines.

In each pixel, the scan line 3*a* is electrically connected to a gate of the TFT 30, and the liquid crystal device 1 is structured so as to sequentially apply scan signals G1, G2, ..., Gm in a pulse form to the scan lines 3*a* in this order at predetermined timing. In each pixel, the pixel electrode 9*a* is electrically connected to a drain of the TFT 30 and thus can switch off the TFT 30 serving as a switching element for a predetermined period. With such a structure, the image signals S1, S2, ..., Sn supplied from the data lines 6*a* are written at the predetermined timing. A predetermined level of the image signals S1, S2, ..., Sn, which is written into the liquid crystals, an exemplary electro-optical material, via the pixel electrodes 9*a* is maintained between the pixel electrodes 9*a* and the opposing electrode formed on the opposing substrate for a predetermined period.

Alignment and order of molecules of the liquid crystals contained in the liquid crystal layer 50 are changed according to a voltage level which is applied. With such a structure, it is possible to modulate light, and this enables grayscale display. In normally white mode, transmittance of incident light is decreased according to the increase of a voltage which is applied with respect to a single pixel. In normally black mode, the transmittance of incident light is increased according to the increase of a voltage which is applied with respect to a single pixel. Thus, the liquid crystal device 1 can emit light having contrast corresponding to the image signal as a whole. Storage capacitors 70 are arranged in parallel with liquid crystal capacitors formed between the pixel electrodes 9*a* and the opposing electrode in order to prevent the image signals from leaking.

Next, with reference to FIGS. 4 to 6, a detailed structure of the pixel portion will be described. In FIG. 4, a plurality of transparent pixel electrodes 9*a* (having an outline indicated by a dotted line 9*a*') are arranged in X direction and Y direction in a matrix form on the TFT array substrate 10 of the liquid crystal device 1. In addition, the data lines 6*a* and the scan lines 3*a* are disposed along longitudinal and lateral boundaries of the pixel electrodes 9*a*. The liquid crystal device 1 has a touch key function which enables various information to be input on the basis of the change of detected capacitance by detecting the change of capacitance generated between the opposing electrode 21 and the pixel electrode 9a by current detecting means (not shown) when input means such as a finger presses the opposing substrate 20 and particularly when the input means presses the outer surface 20S which does not face the liquid crystal layer 50, of both surface of the opposing substrate 20.

The scan lines 3a are arranged so as to face channel regions 1a' which are areas hatched up to right in FIG. 4, in a semiconductor layer 1a. As described above, the TFTs 30 serving as switching elements are disposed at every intersection of the scan lines 3a and the data lines 6a.

The data lines 6a are formed on a base film 42a formed using a second inter-layer insulation film 42 having the planarized surface as a base film and are connected to heavily-doped source regions of the TFTs 30 via contact holes 81. The data lines 6a and contact members in the contact holes 81 are made of a material containing aluminum (Al) such as Al—Si—Cu or Al—Cu, aluminum only, or a multi-layered structure including an aluminum layer and a TiN layer. The data lines 6a functions as a light-blocking layer for preventing light from entering the TFTs 30.

Each of the storage capacitors 70 is formed by a lower capacitor electrode 71 serving as a pixel potential side capacitor electrode, which is connected to a heavily-doped drain region 1e and the pixel electrode 9a, part of an upper capacitor electrode 300 serving as a fixed potential side capacitor electrode, which is formed so as to face the lower capacitor electrode 71, and a dielectric film 74 interposed between the lower capacitor electrode 71 and the part of the upper capacitor electrode 300.

As shown in FIGS. 4 and 5, the upper capacitor electrode 300 serves as an upper opaque film (embedded opaque film) containing gold or gold alloy and is disposed on the TFT 30. The upper capacitor electrode 300 also functions as the fixed potential side capacitor electrode. The upper capacitor electrode 300 is made of a single metal only, a metal alloy, a metal silicide, a poly silicide, or a stacked structure thereof, each including at least one metal of titanium (Ti), chrome (Cr), tungsten (W), tantalum (Ta), molybdenum (Mo), palladium (Pd), and aluminum (Al). The upper capacitor electrode 300 may be a multi-layered structure including a first film made of a conductive polysilicon film and a second film made of a metal silicide film containing refractory metal.

The lower capacitor electrode 71 may be made of a single metal only, a metal alloy, a metal silicide, a poly silicide, or a stacked structure thereof, each including at least one metal of Ti, Cr, W, Ta, Mo, Pd, and Al. The lower capacitor electrode 71 serves as the pixel potential side capacitor electrode. Besides the function of the pixel potential side capacitor electrode, the lower capacitor electrode 71 has a light absorbing function. The lower capacitor electrode 71 is disposed between the upper capacitor electrode 300 serving as the upper opaque film and the TFT 30. In addition, the lower capacitor electrode 71 has a further function of a transit connector between the pixel electrode 9a and the heavily-doped drain region 1e of the TFT 30. However, like the upper capacitor electrode 300, the lower capacitor electrode 71 may be made of a single layer of a metal or a metal alloy, or a multi-layered structure.

The dielectric film 75 disposed between the lower capacitor electrode 71 serving as the capacitor electrode and the upper capacitor electrode 300 is made of a silicon oxide film such as high temperature oxide (HTO) film and low temperature oxide (LTO) film, or a silicon nitride film.

The upper capacitor electrode 300 extends to a region disposed outside the image display region 10a in which the pixel electrodes 9a are disposed, is electrically connected to a positive potential source, and is fixed at a fixed potential.

The lower opaque film 11a having a matrix form is disposed under the TFTs 30 with a base insulation film 12 interposed therebetween blocks light which is made incident onto the TFT array substrate 10 side of the liquid crystal device from entering the channel regions 1a' of the TFTs 30 and peripheral regions of the TFTs 30. Like the upper capacitor electrode 300, the lower opaque film 11a is made of a single metal only, a metal alloy, a metal silicide, a poly silicide, or a stacked structure, each containing at least one metal of Ti, Cr, W, Ta, Mo, and Pd.

The base insulation layer 12 functions to prevent characteristics of the TFTs 30 serving as switching elements from deteriorating attributable to roughness which occurs when the surface of the TFT array substrate 10 is polished and contaminants remaining after cleansing by being formed so as to cover the entire surface of the TFT substrate 10 as well as functions to insulate the TFTs 30 from the lower opaque film 11a. The pixel electrodes 9a are electrically connected to the heavily-doped drain regions 1e of the semiconductor layer 1a via the contact holes 83 and 85 by serving as junctions of the lower capacitor electrodes 71.

As shown in FIGS. 4 and 5, the liquid crystal device 1 includes the transparent TFT array substrate 10 and the transparent opposing substrate 20 arranged so as to face the transparent TFT array substrate 10. The TFT array substrate 10 is made of a quartz substrate, a glass substrate, or a silicon substrate, and the opposing substrate 20 is made of a glass substrate or a quartz substrate.

The TFT array substrate 10 is provided with the pixel electrodes 9a and the aligning film 16, to which predetermined aligning processing such as rubbing is performed, is disposed on the pixel electrodes 9a. For example, the pixel electrodes 9a are made of a transparent conductive film such as an indium tin oxide (ITO) film, and the aligning film 16 is made of an organic film such as a polyimide film.

Spacers 151a and 151b are formed on the TFT array substrate 10 in order to establish the inter-substrate gap between the TFT array substrate 10 and the opposing substrate 20. The spacers 151a and 151b are made of a positive type photosensitive material such as acryl resin or polyimide resin and are formed to have predetermined sizes and shapes by a photolithography process.

The opposing electrode 21 is disposed over the entire area of the opposing substrate 20. Under the opposing electrode 21, the aligning film 22, to which predetermined aligning processing such as rubbing is performed, is disposed. The opposing electrode 21 is made of, for example, a transparent conductive film, such as an ITO film. The aligning film 22 is made of an organic film, such as a polyimide film.

It is preferable that an opaque film having a matrix pattern or a stripe pattern is disposed on the opposing substrate 20. With such a structure, it is possible to securely prevent light, which is made incident from the TFT array substrate side, from entering the channel regions 1a' and the peripheral regions of the channel regions 1a by acting with the upper opaque film serving as the upper capacitor electrode 300 together.

The liquid crystal layer 50 is formed between the TFT array substrate 10 and the opposing substrate 20, on which the pixel electrodes 9a and the opposing electrode 21 are arranged, respectively, and which have the above-described structure. The liquid crystal layer 50 is in a predetermined alignment state due to the aligning films 16 and 22 in the state in which an electric field from the pixel electrodes 9a is not applied to thereto.

In FIG. 5, each of TFTs 30 serving as switching elements has a lightly doped drain (LDD) structure and thus includes a gate electrode 3a2, a channel region 1a' of a semiconductor layer 1a in which a channel is formed by an electric field applied from the scan line 3a, an insulation film 2 including a gate insulation film which insulates the scan line 3a and the semiconductor layer 1a from each other, a lightly-doped source region 1b, a lightly-doped drain region 1c, a heavily-doped source region 1d, a heavily-doped drain region 1e. The lightly-doped source region 1b, the lightly-doped drain region 1c, the heavily-doped source region 1d, and the heavily-doped drain region 1e are formed of impurity regions formed in the semiconductor layer 1a, and are symmetrically formed on both sides of the channel region 1a' in a mirror-symmetric manner.

The gate electrode 3a2 is made of a conductive film such as a polysilicon film, a single metal only, a metal alloy, a metal silicide, a polysilicide, or a stacked structure thereof, each containing at least one metal of Ti, Cr, W, Ta, Mo, Pd, and Al. The gate electrode 3a2 is disposed over the channel region 1a' with the insulation film 2 in between so as not to overlap the lightly-doped source region 1b and the lightly-doped source region 1c. Accordingly, in each TFT 30, an offset margin between the heavily-doped source region 1d and the heavily-doped drain region 1e and the gate electrode 3a2 can be sufficiently provided.

Further, the edge of the gate electrode 3a2 overlaps borders between the lightly-doped source region 1b and the channel region 1a' and between the lightly-doped drain region 1c and the channel region 1a' so parasitic capacitance generated between the lightly-doped source region 1b and the gate electrode 3a2 and between the lightly-doped drain region 1c and the gate electrode 3a2 is reduced. Accordingly, the TFTs 30 operate at high speed and thus it is possible to improve display performance of the liquid crystal device 1.

In addition, in the liquid crystal device 1, it is possible to more effectively block light from entering the lightly-doped source regions 1b and the lightly-doped drain regions 1c using the upper capacitor electrode 300 formed on the gate electrodes 3a2 so as to cover the TFTs 30 in comparison with a structure in which, only gate electrodes 3a2 of TFTs 30 serves as an opaque film for blocking light.

As described above, according to the liquid crystal device 1, it is possible to reduce problems such as flickers occurring when performing image display and to display a high-grade image by using the TFTs 30 having a structure in which photo leak current is reduced. In addition, since the TFTs 30 have the LDD structure, off-current flowing in the lightly-doped source regions 1b and the lightly-doped drain regions 1c when the TFTs 30 are not driven is reduced, and loss of on current-current flowing when the TFTs 30 are driven is suppressed. Accordingly, according to the liquid crystal device 1, it is possible to display a high-grade image thanks to the advantageous effects of the LDD structure and the negligeable photo leak current.

A first inter-layer insulation film 41 having contact holes 81 extending to the heavily-doped source regions 1d and contact holes 83 extending to the heavily-doped drain regions 1e is formed on the lower opaque film 11a.

The lower capacitor electrodes 71 and the upper capacitor electrode 300 are formed on the first inter-layer insulation film 41. A second inter-layer insulation film 42 having contact holes 81 and 85 is formed on a structure with the lower capacitor electrodes 71 and the upper capacitor electrodes 300.

The second inter-layer insulation film 42 in this embodiment is made of boro-phospho-silicate glass (BPSG) and has a planarized upper surface by undergoing a fluidizing process, such as heating. That is, steps initially are present on the surface of the second inter-layer insulation film 42 during a film forming process due to the presence of the lower capacitor electrodes 70, the TFTs 30, the scan lines 3a, and the base opaque film 11a. However, roughness of the surface of the second inter-layer insulation film 42 is eliminated and the surface of the second inter-layer insulation film 42 becomes even thanks to the fluidizing process.

Alternatively, a step alleviating process using photosensitive acryl resin is generally used in order to treat the surface of the second inter-layer insulation film 42.

Further, a third inter-layer insulation film 43 having the contact holes 85 is formed so as to cover the entire surface of the second inter-layer insulation film 42 and the data lines 6a. The third inter-layer insulation film 43 may be made of BPSG. The pixel electrodes 9a and the aligning film 16 are disposed on the upper surface of the third inter-layer insulation film 43.

Further, a step alleviating process using photosensitive acryl resin is generally used in order to treat the surface of the third inter-layer insulation film 42.

Next, the spacers 151a and 151b will be described in detail with reference to FIGS. 4 to 6.

As shown in FIGS. 4 to 6, the spacers 151a are formed in a transmissive region, which allows light introduced from back surface of the TFT array substrate 10 and emitted from a light source to transmit therethrough, of an open region practically contributing to image display of the image display region 10a. In greater detail, the open region is a region from which light corresponding to an image to be display on the displaying surface 20S is emitted by the action of light reflection or transmission. The open region is surrounded by a closed region in which opaque films such as the data lines 6a are disposed. In the transmissive region, light emitted from a light source is modulated in the liquid crystal layer 50 according to the alignment state of the liquid crystal layer 50 and exit the displaying surface 20S as modulated light. The spacers 151b are formed in a reflective region, in which reflective films 39 are disposed, of the open region. The reflective film 39 reflects the light entering from the opposing substrate 20 so as to be turned back to the opposing substrate 20, the reflective light is modulated in the liquid crystal layer 50, and the modulated light exits from the displaying surface 20S. The spacers 151a and 151b are simultaneously formed by coating a photosensitive material, such as acryl resin, on the TFT array substrate 10, and performing exposure with respect to the coated photosensitive material by a photolithography process.

The spacers 151a and 151b have different aspect ratios from each other. In greater detail, an aspect ratio of the spacers 151b is higher than that of the spacers 151a. The spacers 151a and 151b can be formed by one exposure so as to have different aspect ratios (i.e. different heights) by the use of a method in which sizes (i.e. widths) of resin patterns to be spacers before exposure are preliminarily adjusted. That is, since light runs round the photosensitive material which is an object of the exposure when performing the exposure, it is possible to form the spacers 151a and 151b having different aspect ratios according to different widths of the resin patterns in a batch manner by performing the exposure processing with respect to the resin patterns having different widths. Accordingly, there is no need to perform a plurality of exposures in order to form the spacers having different aspect ratios 151a and 151b and thus the manufacturing process of the liquid crystal device 1 does not become complex.

Since the spacers 151a and 151b have different aspect ratios from each other, in the case in which the liquid crystal device contracts under low temperature condition, it is possible to maintain the inter-substrate gap by the spacers 151b although the spacers 151a cannot maintain the inter-substrate gap. Accordingly, even in the case in which the liquid crystal device 1 contracts due to ambient temperature, it is possible to secure the inter-substrate gap by either the spacers 151a or the spacers 151b having different aspect ratios. This contributes to enhancement of the reliability of the liquid crystal device 1.

On the other hand, it is preferable that the spacers having the same aspect ratio of the spacers 151a and 151b having different aspect ratios formed on the TFT array substrate 109 are distributed uniformly over the TFT array substrate 10 with a view to uniformly maintain the inter-substrate gap over the entire region of the TFT array-substrate 10 when the liquid crystal device 1 contracts.

In this embodiment, two kinds of spacers 151a and 151b having different aspect ratios are exemplified, but three or more kinds of spacers having different aspect ratios may be formed on the TFT array substrate 10.

In this embodiment, since the spacers 151a and the spacers 151b having different aspect ratios are formed in the transmissive region and the reflective region, respectively, it is possible to secure the inter-substrate gap at both the transmissive region and the reflective region, and thus it is possible to prevent the display quality of the liquid crystal device 1 from being degraded.

Next, an advantage in that the spacers having different aspect ratios are applied to the liquid crystal device 1 having a touch key function will be described with reference to FIG. 6.

In FIG. 6, the liquid crystal device 1 has the capacitance type touch key function enabling a variety of information to be input to the liquid crystal device 1 according to the change of the capacitance formed between the opposing substrate 20 and the TFT array substrate 10 by pressing the opposing substrate 20 from the displaying surface 20S of the opposing substrate 20. Here, spacers 151b are an example of "predetermined spacers" of the invention. The opposing substrate 20 bends toward the TFT array substrate 10 when the displaying surface 20S of the opposing substrate 20 is pressed. The spacers 151b secure the inter-substrate gap between the opposing substrate 20 and the TFT array substrate 10 so the bent opposing substrate 20 not to come into contact with the TFT array substrate 10, i.e. in detail, so the opposing electrode 21 not to come into contact with the pixel electrodes 9a. Thanks to the spacers 151b, in even the case in which the opposing substrate 20 is pressed, it is possible to prevent the opposing electrode 21 and the pixel electrodes 9a from being short-circuited. Further, it is preferable that an aspect ratio of such spacers 151b be 0.3 or more.

Accordingly, according to the liquid crystal device 1, it is possible to precisely detect information input to the displaying surface 20S using input means such as a finger. In addition, since spacers 151a having higher strength than spacers 151b are formed, it is possible to enhance strength of the liquid crystal device 1 without negatively affecting the touch key function.

As described above, according to the liquid crystal device 1, the manufacturing process is not complex. Further, it is possible to provide a liquid crystal device having high reliability because it is possible to maintain the inter-substrate gap. Still further, it is possible to provide a liquid crystal device which can perform high quality image display while it has a touch key function.

2: Electronic Apparatus

Next, embodiments relating to an electronic apparatus having the above-described liquid crystal device will be described.

Figure 7:
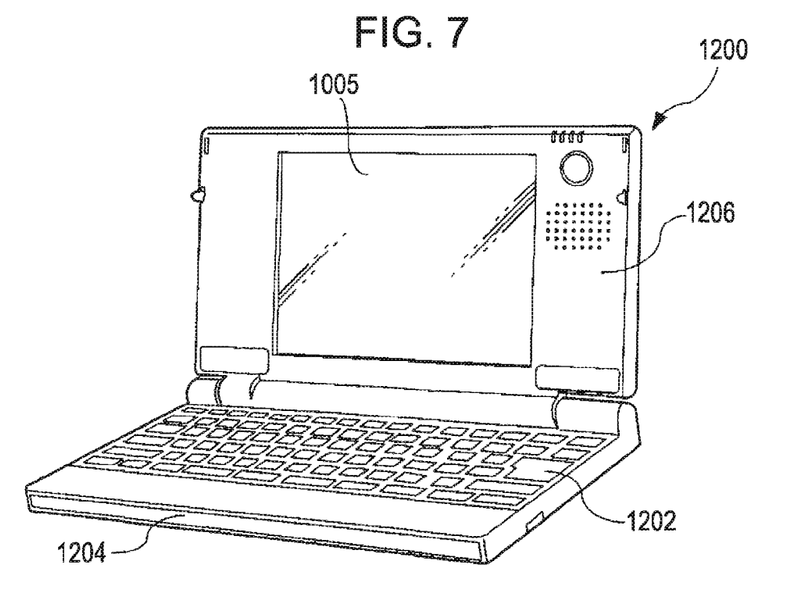
FIG. 7 is a perspective view illustrating a computer which is an example of an electronic apparatus according to a further embodiment.

FIG. 7 is a perspective view illustrating a mobile-type personal computer to which the above-described liquid crystal device is applied. In FIG. 7, the computer 1200 includes a main body 1204 having a keyboard 1202 and a liquid crystal display unit 1206 including the above-described liquid crystal device. The liquid crystal display unit 1206 can be constructed by adding a back light to the back side of the liquid crystal panel 1005, has a touch panel function, and has high reliability.

Figure 8:
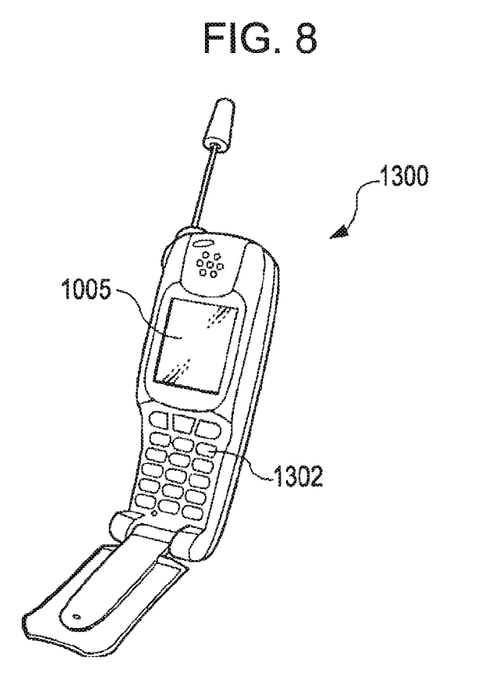
FIG. 8 is a perspective view illustrating a cellular phone which is a further example of an electronic apparatus according to a still further embodiment.

Next, an exemplary application in which the above-described liquid crystal device is applied to a cellular phone will be described. FIG. 8 is a perspective view illustrating a cellular phone, which is an electronic apparatus according to one embodiment of the invention. In FIG. 8, the cellular phone 1300 includes a plurality of manipulation buttons 1302 and a liquid crystal device 1005 employing a reflective type display system and having a plurality of spacers having different aspect ratios like the above-described liquid crystal device. The liquid crystal device 1005 has a front light disposed on a front surface when the need arises. According to the cellular phone 1300, a variety of information can be input according to the movement of input means such as a finger and high-grade image display can be accomplished.

What is claimed is:

1. A liquid crystal device, comprising:
   a substrate;
   an opposing substrate disposed so as to face the substrate;
   a liquid crystal layer interposed between the substrate and the opposing substrate;
   a touch key structure enabling a variety of information to be input by change of capacitance formed between the opposing substrate and the substrate when a surface of the opposing substrate, which does not face the liquid crystal layer, is pressed;
   a first spacer disposed between the substrate and the opposing substrate for maintaining a constant distance between the substrate and the opposing substrate; and
   a second spacer disposed on the substrate so as not to be in contact with the opposing substrate, the second spacer having a lower height than that of the first spacer and having a narrower width than that of the first spacer.

2. The liquid crystal device according to claim 1, further comprising a display region on the substrate including a transmissive region and a reflective region, the first spacer disposed in the transmissive region, the second spacer disposed in the reflective region.

3. An electronic apparatus, comprising the liquid crystal device according to claim 1.

* * * * *